United States Patent [19]

Bobbio

[11] Patent Number: 5,290,400
[45] Date of Patent: Mar. 1, 1994

[54] FABRICATION METHOD FOR MICROELECTROMECHANICAL TRANSDUCER

[75] Inventor: Stephen M. Bobbio, Wake Forest, N.C.

[73] Assignee: MCNC, Research Triangle Park, N.C.

[21] Appl. No.: 992,528

[22] Filed: Dec. 17, 1992

Related U.S. Application Data

[62] Division of Ser. No. 619,183, Nov. 27, 1990, Pat. No. 5,206,557.

[51] Int. Cl.⁵ .............................................. H02N 1/00
[52] U.S. Cl. ................................... 156/655; 156/656; 156/661.1
[58] Field of Search .................... 156/656, 655, 659.1, 156/661.1

[56] References Cited

U.S. PATENT DOCUMENTS

| | | |
|---|---|---|
| 2,975,307 | 3/1961 | Schroeder et al. |
| 3,008,014 | 11/1961 | Williamson et al. |
| 3,153,229 | 10/1964 | Roberts |
| 3,315,103 | 4/1967 | Duff et al. |
| 3,345,469 | 10/1967 | Rod |
| 3,389,226 | 6/1968 | Peabody |
| 4,034,332 | 7/1977 | Alais |
| 4,042,438 | 8/1977 | Kawakami et al. |
| 4,160,882 | 7/1979 | Driver |
| 4,206,369 | 6/1980 | Lewiner et al. |
| 4,207,442 | 6/1980 | Freeman |
| 4,342,935 | 8/1982 | Kallmeyer et al. |
| 4,384,230 | 5/1983 | Wisner |
| 4,429,190 | 1/1984 | Stockbridge |
| 4,510,412 | 4/1985 | Suda et al. |
| 4,615,591 | 10/1986 | Smith et al. |
| 4,665,610 | 5/1987 | Barth ..................... 156/644 X |
| 4,678,955 | 7/1987 | Toda |
| 4,721,447 | 1/1988 | Erckmann |
| 4,789,803 | 12/1988 | Jacobsen et al. |
| 4,814,657 | 3/1989 | Yano et al. |
| 4,841,191 | 6/1989 | Takata et al. |
| 4,863,252 | 9/1989 | McCarthy et al. |
| 4,887,248 | 12/1989 | Griebeler |
| 4,897,592 | 1/1990 | Hyde |
| 5,001,381 | 3/1991 | Watanabe |
| 5,113,566 | 5/1992 | Weekamp et al. |

OTHER PUBLICATIONS

PCT International Search Report dated Mar. 23, 1992 of International Appln. No. PCT/US 91/08901 filed Nov. 25, 1991.
*Silicon Micromechanics: Sensors and Actuators on a Chip*, SPECTRUM, Jul. 1990, Howe, R. T. et al., University of California at Berkley; Gabriel, K. J. et al., AT&T Bell Laboratories.

*Primary Examiner*—Thi Dang
*Attorney, Agent, or Firm*—Bell, Seltzer, Park & Gibson

[57] ABSTRACT

A microelectromechanical transducer including a plurality of strips arranged in an array and maintained in a closely spaced relation by a plurality of spacers. An electrically conductive layer on portions of the strips and spacers distributes electrical signal within the transducer to cause adjacent portions of the strips to move together. The strips and spacers may be formed from a common dielectric layer using microelectronic fabrication techniques. Two transducers may be coupled at an angle offset from parallel for two-dimensional micropositioning. A photodetector and Fresnel lens may be combined with the micropositioner using the transducers for optical scanning microscopy.

9 Claims, 10 Drawing Sheets

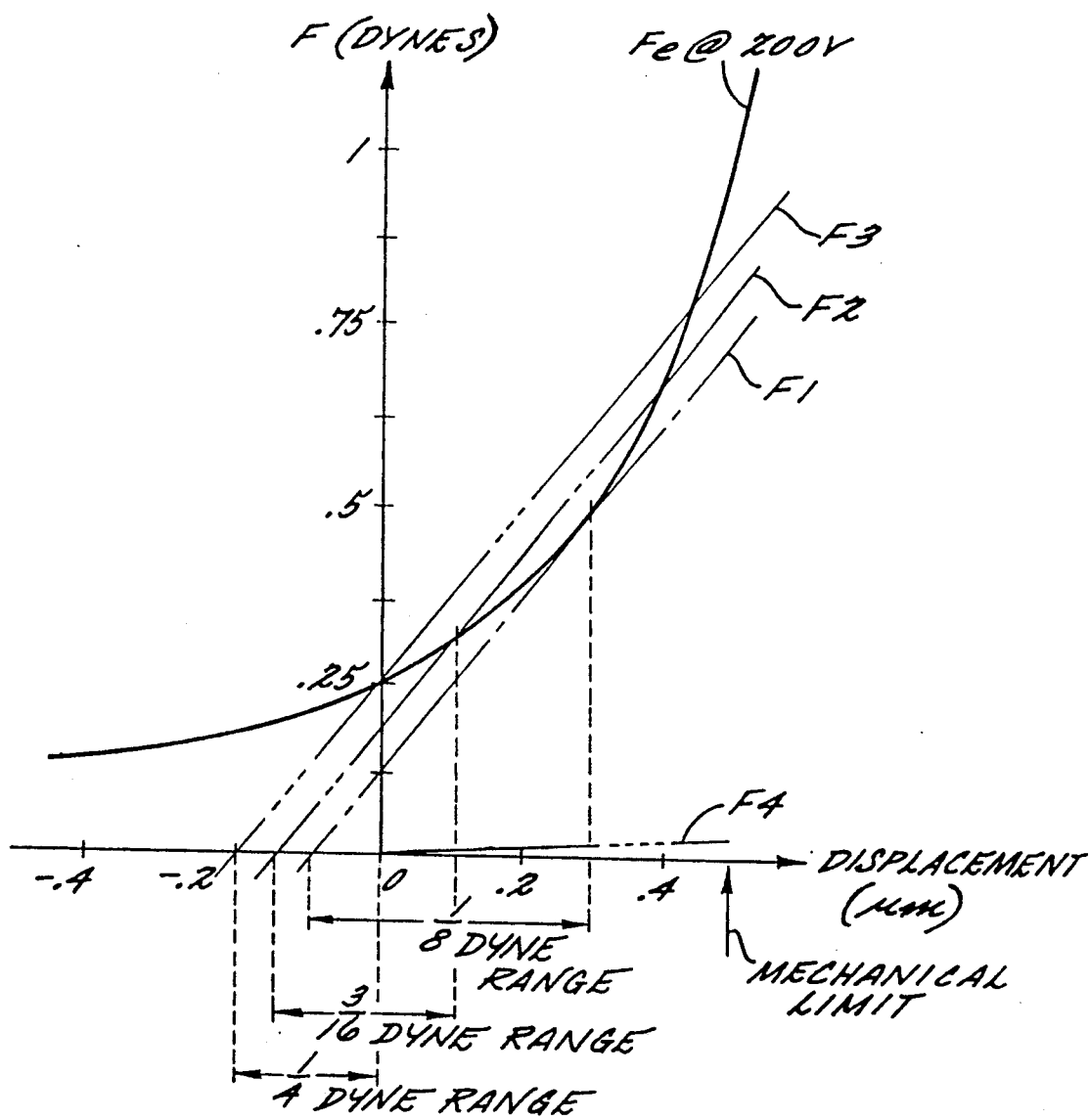

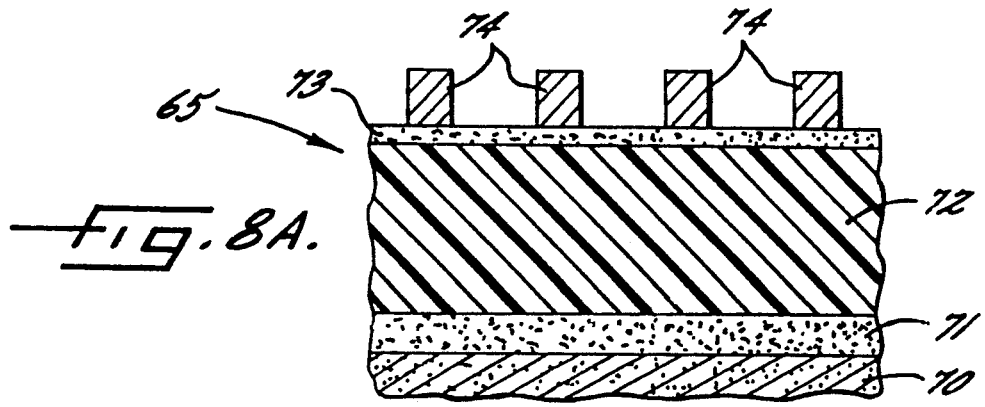
FIG. 8A.
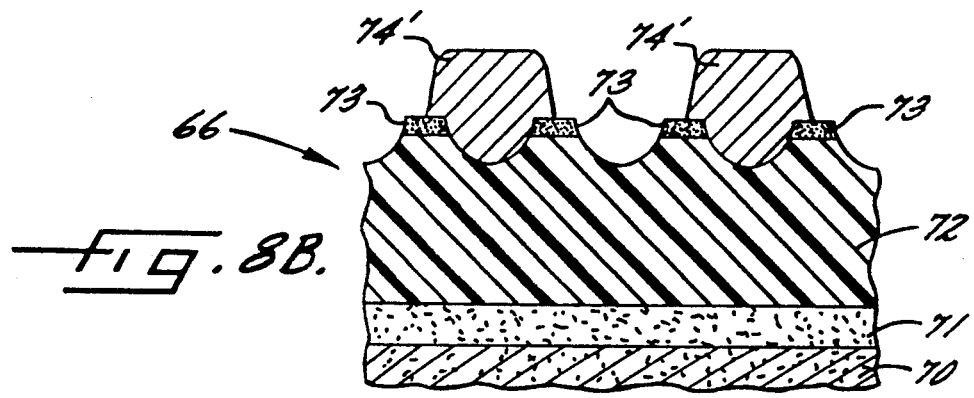
FIG. 8B.
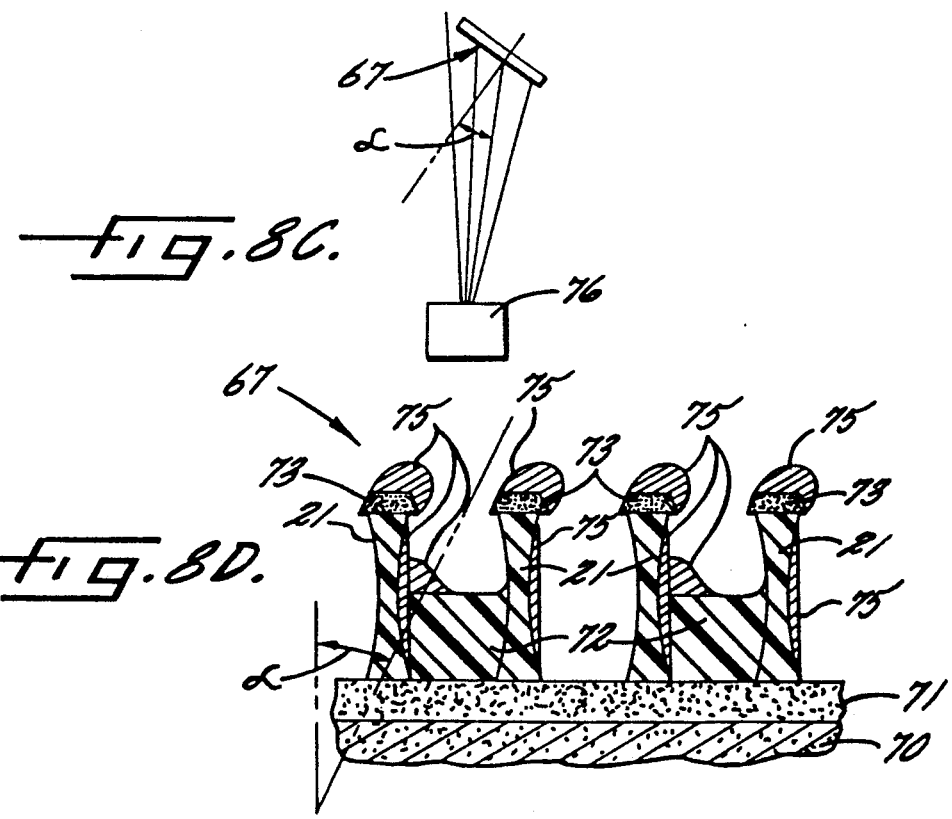
FIG. 8C.
FIG. 8D.

FABRICATION METHOD FOR MICROELECTROMECHANICAL TRANSDUCER

This application is a division of application Ser. No. 07/619,183, filed Nov. 27, 1990, now U.S. Pat. No. 5,206,557.

FIELD OF THE INVENTION

This invention relates to an electromechanical transducer and more particularly to a microelectromechanical transducer having an array of closely spaced electrically conductive strips which move together responsive to an applied electrical signal, and a method of fabricating same.

BACKGROUND OF THE INVENTION

A transducer may be broadly defined as a device which converts one form of input energy to a different form of output energy. An electromechanical transducer, when configured to convert electrical energy to mechanical energy, may operate on the principle of electrostatic attraction caused by two opposing and oppositely charged conducting plates. For example, as electrical energy is input to the transducer in the form of a voltage applied between the plates, the plates are drawn together If the plates are free to move together, the input electrical energy is converted into mechanical energy The plates of an electromechanical transducer may also be used to generate electrical energy from an input of mechanical energy. For example, the plates are first charged by an electrical voltage applied to the plates. The plates may then be disconnected from the charging source and mechanical energy used to further separate the plates. As the plates are separated, the voltage between the plates increases thereby converting the mechanical energy to electrical energy.

Accordingly, an electromechanical transducer may be used either as an actuator or a sensor. As an actuator, the transducer may convert electrical power into mechanical motion, and, as a sensor, the transducer may convert mechanical motion into an electrical signal.

Electromechanical transducers have been developed which convert electrical energy to mechanical motion and ultimately to acoustic energy by the application of a voltage between a pair of spaced parallel conducting plates. If the plates are flexible or otherwise configured to allow motion, the plates are drawn together by the force of electrostatic attraction when the signal voltage is applied between the plates. See, for example, U.S. Pat. No. 3,008,014 to Williamson et al., which discloses an electrostatic transducer used in entertainment loudspeaker systems to convert electrical signals into sound. Since the driving voltage required to move the plates is related to the square of the separation between the plates, transducers of the type described in Williamson et al. require large and potentially hazardous driving voltages.

As is known in the art, the force generated by a pair of opposing parallel plates is inversely proportional to the square of the distance between the plates. The force generated by the plates increases by a power of two for a corresponding linear decrease in the separation between the plates. Accordingly, very large forces can be developed as the spacing between plates is decreased. In addition, for a given force, as the separation is decreased, the driving voltage can be reduced.

To obtain useful forces and physical displacements as the size of the separation between plates is reduced, a large number of plates must be concatenated or stacked together U.S. Pat. No. 2,975,307 to Schroeder et al. discloses an electrostatic transducer having a large number of stacked plates, each plate with an individual and discrete external wiring connection to the source of the driving voltage, and each pair of adjacent plates having a series of individual and discrete separators placed in a precise pattern therebetween.

Unfortunately, it is difficult to connect each of the plates to a supply voltage in a array having a large number of closely spaced plates. In an array of closely spaced stacked plates, many hundreds or even thousands of discrete connections must be made to each plate in the stacked array of plates. In addition, the physical assembly of such a large number of plates, spacers, and other components of such small dimensions is extremely difficult and not, therefore, amenable to efficient manufacturing. An array of closely spaced stacked plates is also typically limited to bistable operation, that is, the array is either fully contracted or fully relaxed.

Conventional electrical, hydraulic and pneumatic actuators are adequate for a wide assortment of applications. An electric motor, and more particularly the electric stepper motor, is frequently used where a predetermined amount of rotation is required. The electric motor can also be interfaced to gears, levers, or other structures to obtain a desired movement of an object. A solenoid typically includes a coil and a spring-loaded plunger or piston which is drawn into the coil by a magnetic field generated by an electric current flowing through the coil windings. Thus, the motor and solenoid consume power whenever their windings are energized. Both the electric motor and solenoid are subject to sliding friction Therefore, the performance of such actuators for fine positioning—micropositioning—is unacceptable. The use of such actuators to obtain precision movement on the order of several microns over similar small distances is impractical. In addition, the bulk and weight of conventional actuators often far exceeds the size of the object to be moved. Inefficiencies thereby result in raw materials for constructing the actuators and in the energy to operate them.

In addition to simple micropositioning, the art has developed two-dimensional positioners for use in, for example, microscopic scanning. Such scanning requires that small displacements are made without binding or overshoot as may typically be caused by sliding friction. Scanning positioning has been done with electric motors, electromagnetic drives, and piezoelectric drives. These positioners are often difficult and expensive to manufacture and maintain and may still be subject to binding or overshoot, such as caused by sliding friction.

The microelectronics art has attempted to overcome some of the limitations of conventional actuators for micropositioning and other actuation applications. For example, the Massachusetts Institute of Technology, has fabricated an eight-pronged rotor that spins around a center bearing as more fully described in Howe, Muller, Gabriel, and Trimmer, "Silicon Micromechanics: Sensors and Actuators on a Chip," IEEE Spectrum, pp. 29-31 and 35 (July, 1990). As described, friction and wear at the bearing points of rotating or sliding structures at these dimensions are of great importance and may readily cause the failure of such a device after a few minutes of operation. However, to the best of applicant's knowledge, microelectronic techniques have not been the basis for the design and fabrication of electromechanical transducers comprising an array of a large number of closely spaced parallel plates in a deformable plastic and metal structure.

SUMMARY OF THE INVENTION

It is therefore an object of the present invention to provide an electromechanical transducer having a large number of conductive plates with a small separation between adjacent plates.

It is another object of the present invention to provide an electromechanical transducer operating at a relatively low voltage to avoid safety hazards while providing a sufficient actuation force.

It is yet another object of the present invention to provide an electromechanical transducer avoiding the need for individual discrete wiring to each plate of the transducer.

It is still another object of the present invention to provide an electromechanical transducer that can produce a continuously variable displacement responsive to a continuously variable control voltage.

It is a further object of the invention to provide an electromechanical transducer that can produce a stepwise controllable variable displacement.

It is yet a further object of the invention to provide a two-dimensional micropositioner which minimizes binding or overshoot during scanning.

It is still a further object of the present invention to provide an electromechanical transducer that is readily and economically fabricated using microelectronics fabrication techniques.

These and other objects according to the present invention are provided by a microelectromechanical transducer formed of a plurality of electrically conductive strips arranged in an array. Adjacent portions of the strips are maintained in a closely spaced relation by a series of spacers positioned between the adjacent portions of the strips. Adjacent portions of strips move together responsive to an electrical signal, such as an electrical voltage, applied thereto. The spacers have electrically conductive portions to distribute the electrical signal within the transducer thereby obviating the need for discrete electrical connections to be made to each conductive strip in the transducer. In addition, unlike a conventional solenoid, for example, the transducer consumes almost no electrical power at its limits of mechanical motion or at any stable equilibrium displacements. Only a minute dielectric leakage current flows in the transducer at any of its powered stable equilibrium displacements.

The strips are preferably made of flexible dielectric material having an electrically conductive layer on selected outer surfaces thereof. In one embodiment according to the invention, the strips may be oriented so that the conductive layer of each strip faces in the same direction. In this configuration, the transducer contracts when the electrical signal is connected in alternating polarity to strips in the transducer. The conductive portions of the spacers are formed so that the alternating strips in the transducer are so interconnected. Connection of the electrical signal may then conveniently be made at an outer portion of the transducer.

The spacers are preferably offset on opposite sides of each strip so that the strips may flex and move together at their centers in response to an applied electrical signal. The spacers are also preferably positioned at regular intervals along the strips and are preferably of similar dimensions so that the strips are maintained in a parallel closely spaced relation.

The dielectric strips and spacers may preferably be formed from a common dielectric layer using microelectronic fabrication techniques to thereby greatly simplify fabrication and to avoid the need for assembling a myriad of microscopic elements. The strips and spacers are preferably formed by selectively etching the dielectric layer and then removing the etched layer from an underlying substrate. The electrically conductive portions of the dielectric strips and spacers may preferably be deposited metal layers. Also, the transducer may be formed on a substrate in conjunction with driving circuitry therefor as part of the same process sequence.

In another embodiment according to the invention, the transducer includes electrically conductive strips arranged in pairs, with each pair being formed of two opposing conductive strips. The opposing strips move together responsive to an electrical signal applied thereto. In this embodiment, spacers are positioned between opposing strips, and pair connectors are positioned between adjacent ones of the pairs. The pair connectors have electrically conductive portions to distribute the electrical signal between strips in adjacent pairs. The strips are also preferably formed of dielectric strips with an electrically conductive layer thereon. The strips are preferably arranged so that the electrically conductive layer is on the outside of each pair. The spacers and the pair connectors are offset on opposite sides of the strips. In this embodiment, the dielectric strips, spacers, and pair connectors may be formed by etching a common dielectric layer.

The transducer according to the present invention may operate as a bistable device having two stable states: fully contracted or fully relaxed. However, the transducer may also provide a continuous range of displacement to a fixed load, that is, an analog-type of operation. The stiffness in the overall transducer may be selected to provide the analog operation. The strips in the transducer may have a predetermined flexibility. In addition, the stiffness of the overall transducer is also controlled by the pattern of openings between adjacent strips defined by the location of the spacers. At least one of the flexibility of the strips and the pattern of openings between adjacent strips may be selected to provide a range of stable equilibrium displacements for the transducer when coupled to a fixed external load. The stiffness of the overall transducer may be increased, for example, by decreasing the flexibility of each of the strips or by decreasing the separation between spacers. Upon proper selection of transducer stiffness, a given input signal range will define a range of analog displacements for operation of the transducer.

The transducer may be formed of several stages, with each stage being adapted to be individually powered. By selectively powering certain stages or combinations of stages, the transducer may perform in a step-wise controllable fashion. In this embodiment, a plurality of individual stages may be aligned in a same predetermined contraction direction. Each stage is formed of strips and spacers as described above. Since each stage may be made very small, very precise micropositioning may be achieved. In addition, because the transducer is a single deformable structure, it operates without sliding friction. This is in contrast to most mechanical actuators which typically comprise a shaft, plunger, piston, or axle which slides on a bearing surface.

The stages are connected by stage connector means, such as dielectric blocks positioned between and connected to adjacent stages. An electrical signal may preferably be distributed to the individual stages within the transducer by incorporating compressible dielectric strands within the transducer. The strands may preferably be formed from a pattern of dielectric strips and spacers with electrically conductive layers on predetermined portions thereof. The electrically conductive layers connect to each stage and provide a convenient means to connect each stage to an electrical signal source at a location on the outer portions of the transducer. The strands are compressible so that they may compress with the contraction of the transducer. The dielectric portion of the strands may preferably be formed of the same common dielectric layer as the stage connectors, and the strips and spacers of the stages.

The step-wise variable transducer may also be provided so that it is digitally controllable having a displacement resolution of substantially one in $2^n - 1$ steps. A series of n stages is arranged in a same predetermined contraction direction. Each stage in the series has a number of strips equal to 2 raised to an integer power of from 0 to $n-1$. By selectively powering the stages, a step-wise digitally controllable operation may be obtained.

In another embodiment of the transducer, a plurality of planar transducers, as described above, may be stacked to provide an additive contraction force. The electrically conductive portions of the planar arrays may receive an insulating coating or a dielectric sheet may be positioned between adjacent planar transducers to form the overall transducer. A common electrical bus may be provided to interconnect predetermined points within each of the planar transducers. Thus, the transducer according to the present invention provides a generic structure which, although based upon microscopic strips and spacers, may be configured of a large number of strips and spacers capable of producing substantial forces and displacements on non-microscopic objects. The change in displacement for the transducer may be a considerable, for example a one third change in overall dimension. The operation of the transducer is also noiseless, energy efficient, and without sliding friction.

Two microelectromechanical transducers may be mechanically coupled to produce a two-dimensional micropositioner. One of the transducers is adapted to be connected to a reference point. The other transducer is adapted to be connected to the object to be positioned with respect to the reference point. The transducers are coupled at an angle from parallel to thereby obtain two-dimensional positioning. The transducers may preferably be coupled at a right angle to achieve the two-dimensional positioning. Opposing pairs of transducers may also be used. Selectively operating either or both transducers together produces micropositioning of the object in two dimensions. Both transducers may be formed from a common dielectric layer along with a dielectric coupler for coupling the two transducers. An electrically conductive layer may be applied to predetermined portions of the dielectric coupler to interconnect the transducers.

The two-dimensional micropositioner may be used for scanning optical microscopy according to the present invention. At least two transducers are needed to produce the two-dimensional scanning. Pairs of opposing transducers or multiple transducers may be used to enhance control or increase the range of scanning. Each transducer may also either be controllable by an analog signal or be step-wise digitally controllable.

The microscopy scanning device also includes a photodetector. The photodetector may also include a Fresnel lens to focus a flood of illumination on the surface to be scanned. The photodetector may be a dot of photosensitive material or it may be in the shape of an annular ring. Both the dot and the annular ring photodetector may be used in some applications. As would be readily understood by those having skill in the art, cadmium sulfide as well as other materials, may be used as the light sensitive material. The transducers, mounting plate, and transducer coupler may be formed from a common dielectric layer thereby producing a low cost optical scanning microscopy membrane.

The microelectromechanical transducer according to the present invention may be fabricated at low cost using microelectronic etching and deposition techniques according to the present invention. A first oxide buffer layer, a support layer of polyimide, and a second oxide buffer layer may first be formed on a substrate. Predetermined portions of the second oxide layer and polyimide layer may then be etched to form a multilevel support structure corresponding to the strips and spacers of the transducer. Selected portions of the strips may be left with the upper oxide layer thereon. In addition, upper portions of the strips may be formed with a rake angle to facilitate shading of areas from a deposited metal layer where no electrically conductive layer is desired. A conductive metal layer may then be evaporated from a source at a predetermined angle relative to the substrate to selectively deposit conductive layers for the strips and the spacers. Unwanted portions of the metal layer may then be removed by etching. The transducer may be separated from the substrate during the same etching process. A multilevel mask may also be employed according to the present invention to form the transducer.

In summary, the microelectromechanical transducer according to the present invention includes a plurality of strips arranged in an array and maintained in a closely spaced relation by a plurality of spacers. An electrically conductive layer on portions of the strips and spacers distributes an electrical signal within the transducer to cause adjacent portions of the strips to move together. The internal electrical signal distribution obviates the need for individual discrete wiring connections to each strip in the transducer. The strips and spacers may be formed from a common dielectric layer using microelectronic fabrication techniques and the electrically conductive layer may also be applied using microelectronic fabrication techniques.

BRIEF DESCRIPTION OF THE DRAWINGS

FIG. 4 is a graph depicting equilibrium displacements for the transducer according to the present invention.

FIGS. 8A to 8D are cross-sectional views illustrating the intermediate structures for a method of fabricating the transducer as shown in FIG. 1A according to the present invention.

DESCRIPTION OF THE PREFERRED EMBODIMENT

The present invention will now be described more fully hereinafter with reference to the accompanying drawings, in which a preferred embodiment of the invention is shown. This invention may, however, be embodied in many different forms and should not be construed as limited to the embodiment set forth herein; rather, applicant provides this embodiment so that this disclosure will be thorough and complete, and will fully convey the scope of the invention to those skilled in the art. Like numbers refer to like elements throughout and prime and double prime notation are used to identify similar elements of alternate embodiments according to the invention. For greater clarity, the thickness of layers as shown has been exaggerated.

Figure 1A:
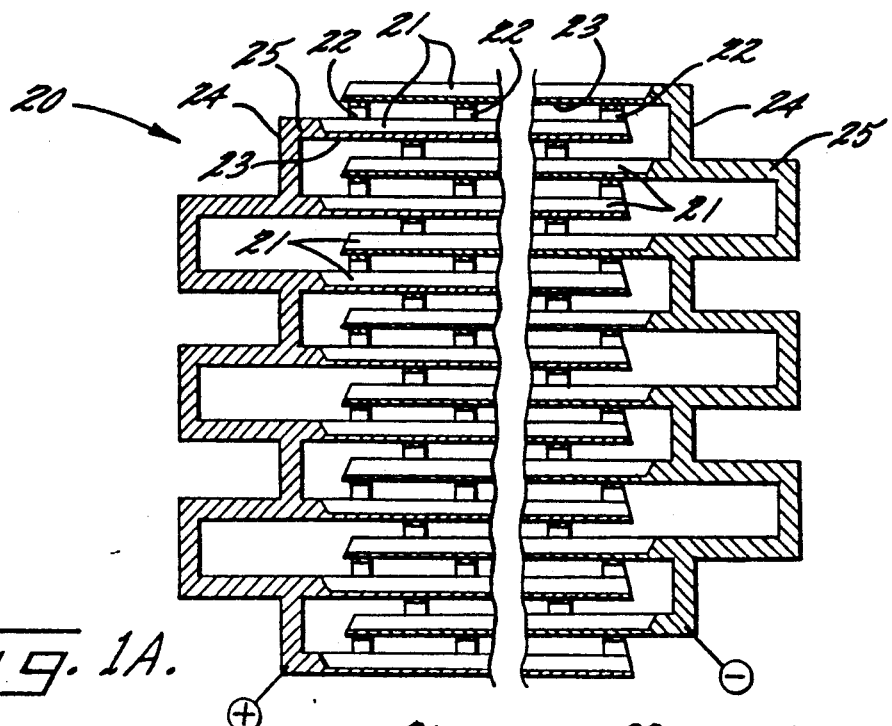
FIG. 1A is a top view of a microelectromechanical transducer according to the present invention in a relaxed, or unpowered, state.
Figure 1B:
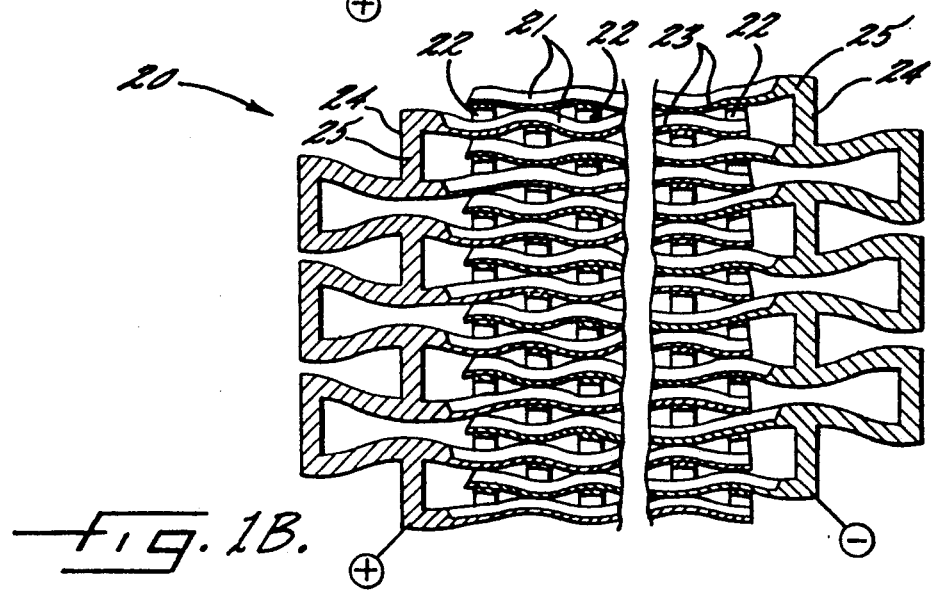
FIG. 1B is a top view of the microelectromechanical transducer according to the present invention, as shown in FIG. 1A, in a contracted, or powered, state.
Figure 1C:
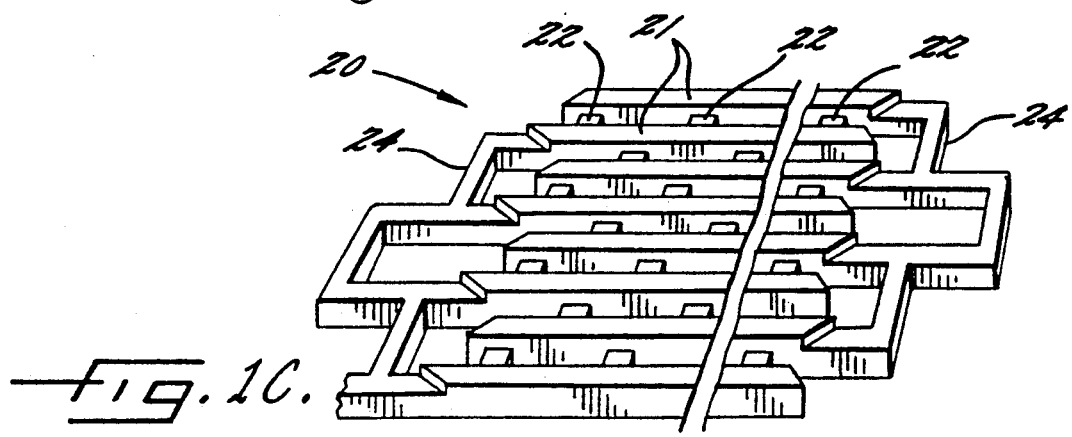
FIG. 1C is a front perspective view of the microelectromechanical transducer according to the present invention, as shown in FIG. 1A.

Referring to FIGS. 1A through 1C, there is shown a microelectromechanical transducer 20 according to the present invention. The transducer 20 includes a plurality of strips 21 arranged in an array. The strips 21 are maintained in a closely spaced relation by spacers 22, 24 positioned between and connected to the strips 21. The strips 21 are preferably formed of a flexible dielectric material, such as polyimide, and include an electrically conductive layer 23. The flexible strips 21 and positioning of the spacers 22, 24 permit the transducer to contract (FIG. 1B) from a relaxed state (FIG. 1A) responsive to an application of an electrical signal, such as an electrical voltage.

In a preferred embodiment according to the invention, the strips 21 are aligned so that all of the conductive layers 23 are oriented in a same direction. To route the electrical signal throughout the transducer 20, alternating strips 21 extend outward at alternating ends of the transducer. The conductive portions 23 of the extending strips 21 are connected to alternating strips 21 by spacers 24 positioned at the ends of the transducer 20 and interconnecting adjacent portions of the extending strips 21. The spacers 24 include an electrically conductive layer 25 on predetermined surfaces thereof to interconnect the alternating strips 21. The entire transducer 20 may then be conveniently powered by only two external connections +,− on outer portions of the transducer. Thus, separate and discrete external connections to each strip 21 within the transducer 20 need not be provided.

The spacers 22 are preferably arranged offset on opposite sides of each strip 21 to thereby allow the strips 21 to move together responsive to the electrostatic force created by an electric signal applied to the strips 21. The spacers 22 are also preferably the same size to maintain the strips 21 in a parallel closely spaced relation and to provide substantially uniform contraction of the transducer 20 when activated.

The strips 21 and spacers 22, 24 are preferably formed by etching a common dielectric layer of a material, such as polyimide, according to the microelectronic fabrication process described below. The conductive layers 23, 25 may then be applied by depositing a metal layer onto predetermined portions of the strips 21 and spacers 22, 24 as also further explained below. Forming the transducer 20 of a common layer obviates the need for first fabricating the individual discrete strips 21 and spacers 22, 24 and then assembling transducer 20 from these discrete pieces. The size of the spacing between adjacent strips 21 in the transducer 20 according to the present invention may then be very small and a large number of strips 21 may be utilized to create useful displacements and useful contraction forces. For example, the strips 21 in the transducer 20 may be 0.5 $\mu$m wide and the spacing between adjacent strips may be 1 $\mu$m also. The distance between neighboring spacers may be 20 $\mu$m. A one centimeter square transducer 20 may, therefore, contain about 3,300 strips 21.

Figure 2A:
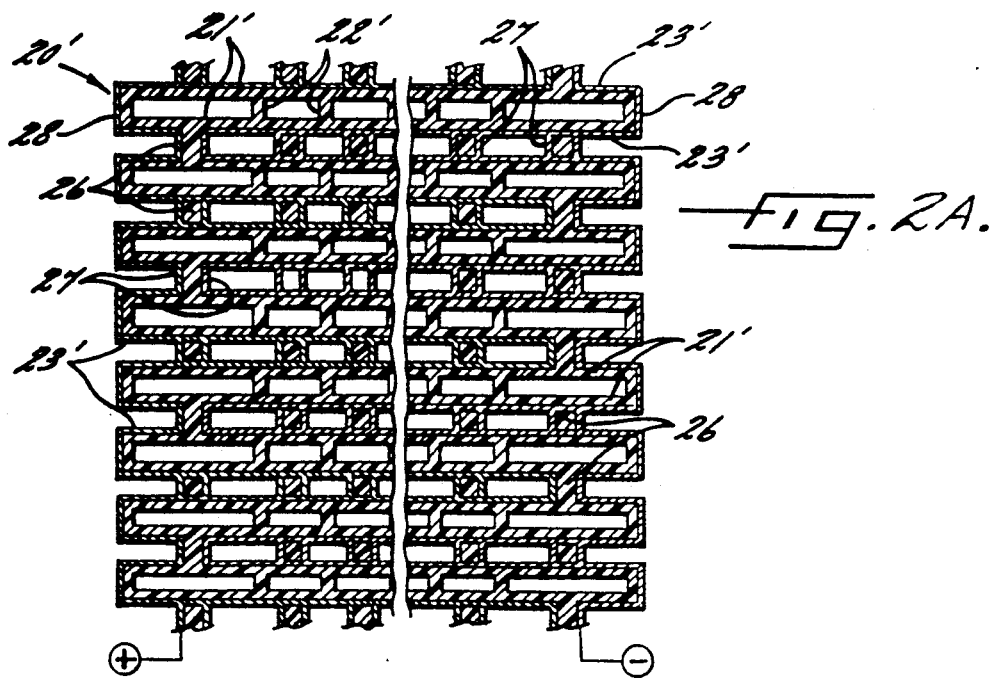
FIG. 2A is a top view of another embodiment of a microelectromechanical transducer according to the present invention in a relaxed, or unpowered, state.
Figure 2B:
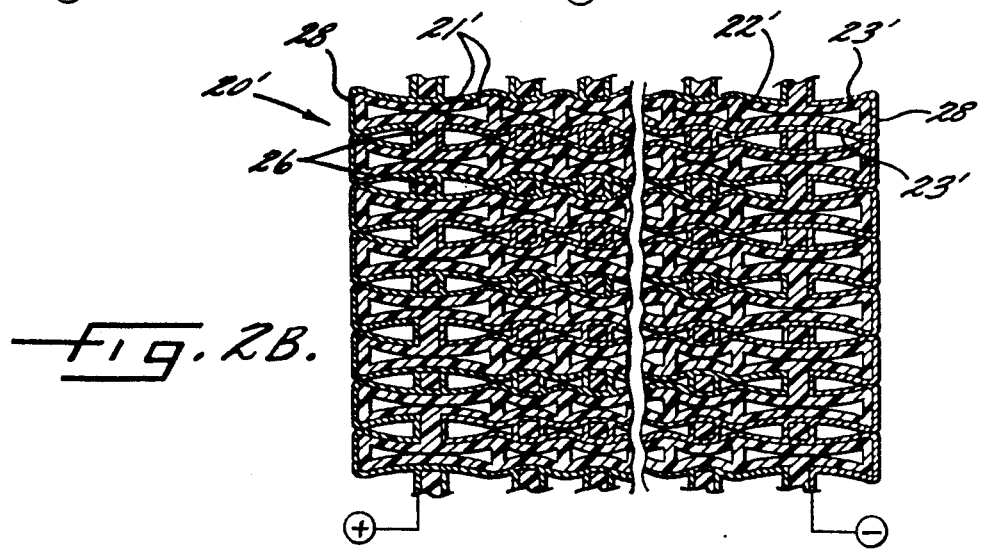
FIG. 2B is a top view of the microelectromechanical transducer according to the present invention, as shown in FIG. 2A, in a contracted, or powered, state.
Figure 2C:
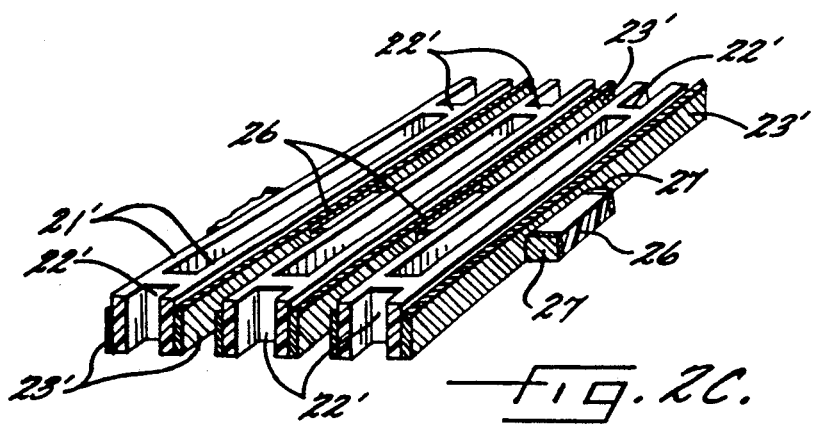
FIG. 2C is a front perspective view of the microelectromechanical transducer according to the present invention, as shown in FIG. 2A.

Referring to FIG. 2A through 2C, there is shown an alternate embodiment of the microelectromechanical transducer 20' according to the present invention. The transducer 20' includes a plurality of strips 21'. The strips 21' are arranged in pairs with an electrically conductive layer 23' on an outer portion of each strip 21'. The strips 21' in each pair are maintained in a closely spaced relation by spacers 22' positioned between and connected to adjacent strips 21' in each pair.

The strips 21' are preferably flexible so that the transducer 20, contracts (FIG. 2B) when an electrical signal is applied thereto. The pairs are preferably formed by strips 21' oriented so that the conductive portions 23' are on the outside of each pair. The pairs are maintained in a closely spaced relation by pair connectors 26 preferably positioned offset from the spacers 22'. The strips 21', spacers 22', and the pair connectors 26 are preferably formed from a common dielectric layer to obviate the need for assembling a large number of individual microscopic components.

An electrical signal is distributed throughout the transducer 20' by pair connectors 26 having electrically conductive layers 27 on predetermined portions thereof to interconnect portions of adjacent pairs of strips 21'. In addition, spacers 22' at the ends of the transducer may also include electrically conductive portions 28 to further distribute the electrical signal within the transducer 20'. An electrical signal applied to outer portions +, − of the transducer 20' will activate the transducer 20' and cause it to contract.

The primary difference between the transducer 20 illustrated in FIGS. 1A–1C and the transducer 20' shown in FIGS. 2A–2C is the pattern of electrical connection within each transducer 20, 20'. The transducer 20 illustrated in FIGS. 1A–1C uses an alternating polarity of electrical connection for adjacent strips 21 and each strip 21 includes the conductive layer 23 aligned in a same direction. In contrast, the transducer 20' shown in FIGS. 2A–2C has strips 21' arranged in pairs with the conductive layer 23' on the outside of the pairs: therefore, the pattern of electrical connection establishes a same polarity between strips 21' in adjacent pairs.

Figure 3A:
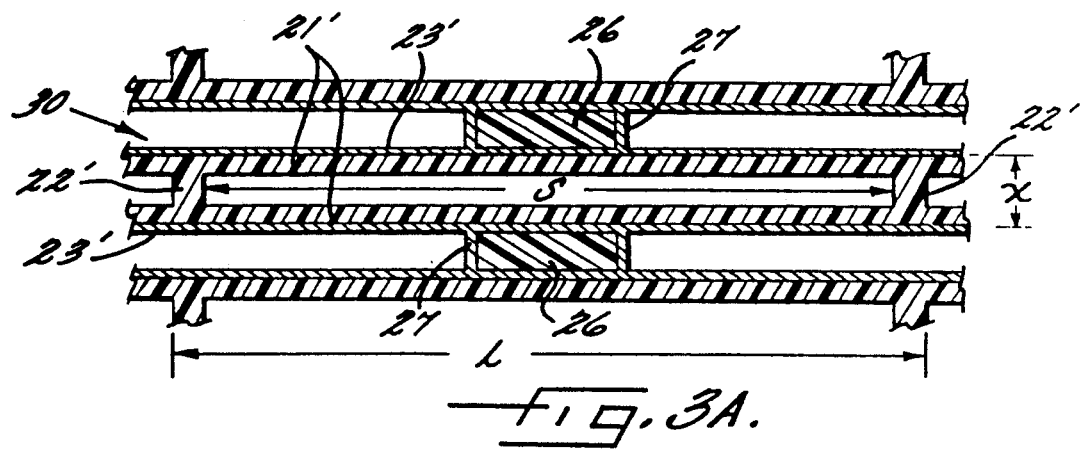
FIG. 3A is a top view of a portion of the microelectromechanical transducer according to the present invention, as shown in FIG. 2A, in a relaxed, or unpowered state.
Figure 3B:
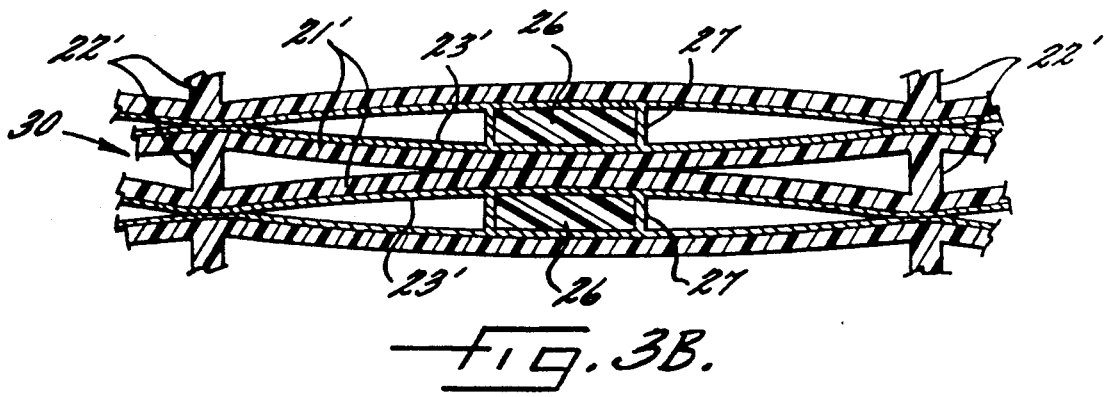
FIG. 3B is a top view of the portion of the microelectromechanical transducer according to the present invention, as shown in FIG. 3A, in a contracted, or powered, state.

Referring to FIGS. 3A and 3B, there is shown a portion of the transducer 20' of FIGS. 2A–2C. The pair of strips 21' may be considered as series of lengthwise units 30 with each unit 30 defined by two strips 21' and two neighboring spacers 22'. If the spacing between strips 21' is made very small, the unit 30 may be made to generate appreciable forces at reasonable operating voltages. For a unit 30 with a strip area A, a strip separation x, an applied voltage V, and a dielectric constant of e, the force F is given as:

$$F = \tfrac{1}{2} \epsilon A V^2 / x^2$$

For example, if the strips 21' are 0.5 μm thick, the spacers 22' are 20 μm apart (s=20 μm), and the spacers 22' separate adjacent strips 21' by 1 μm, the conductive layers 23' are therefore separated by 2 μm (x=2 μm). Substituting into the equation the appropriate constants for polyimide (3.5) and air (1.0) as dielectrics, the dimensions as noted, and using a voltage of 200 volts (polyimide breakdown voltage when two 0.5 μm strips are together as shown in FIG. 3B), the resultant force is calculated to be about 0.28 dynes per unit 30 in the transducer 20' at the beginning of contraction.

Some of the force generated by the unit 30, however, will be used to deflect the strips 21' of polyimide while the remainder is available for external work. Considering the dimensions of the unit 30 and using Young's modulus for polyimide, the force required to deflect the strips 21' is calculated to be 0.018 dynes. The metal layer 23' applied to the polyimide strips 21' must also be deflected. With a metal layer of 0.1 μm, the force required to deflect the metal is calculated as 0.02 dynes. The amount of force available from the unit 30, taking into account deflection for both the polyimide and the metal layer 23', is therefore calculated to be 0.24 dynes or about ¼ dyne.

The pair connectors 26 are subjected to the force applied by the units 30 and will elongate. For a polyimide connector 26 with a cross-section of 1 μm by 2 μm, the elongation in response to the ¼ dyne force is calculated to be approximately 0.01 μm. When compared to the contraction of the unit 30 which is defined by the 1 μm gap between the strips 21', this elongation is negligible. Since each unit 30 and adjacent pair connector 26 is 3 μm long and the contraction is 1 μm per unit 30, the net contraction of a series of units 30 forming the transducer 20' (FIGS. 2A–2C) is calculated to be 33%. Connecting additional units 30 in the same direction does not increase the net force, but rather increases the magnitude of the displacement change caused by the cumulative contraction of the individual units 30. To increase the force developed by a transducer comprising an array of units 30, the units are arranged and connected in parallel, that is, units are added to the right and left of the unit 30 shown. The force generated by each parallel unit 30 is then additive.

Working in reverse through the above analysis, it can be shown that the calculated minimum voltage required to contract the unit 30 without any force left over for external work is approximately 74 volts. In summary, each unit 30 can generate a force of ¼ dyne at 200 volts, the minimum activation voltage is 74 volts and the amount of contraction is 33%. The unit 30 consumes almost no power when it is in a stable equilibrium displacement. Other than a small dielectric leakage current, electrical current only flows into the unit 30 during contraction when the strips 21' are being charged.

FIG. 4 shows several plots of force, in dynes, versus the displacement, in μm, for the unit 30 having different dimensions to thereby alter the stiffness of the unit 30. Negative displacements are shown corresponding to an external force stretching the strips 21' in the unit 30 beyond the normal relaxed position. The normal relaxed displacement is at x=0.

Plots $F_1$, $F_2$, and $F_3$ represent the negative of the inherent spring force plus a series of fixed external loads, or forces, for a unit 30 having a large inherent spring force. Plot $F_4$ represents the negative of the spring force for the unit 30 having dimensions as described above. For ease of understanding, the negative of the spring force plus the external force are shown. The electrostatic force curve $F_e$ is shown for an applied voltage of 200 volts corresponding to the breakdown voltage of polyimide for the dimensions as noted. A net force of zero is represented where the negative of the spring force plus an external force crosses the electrostatic force curve $F_e$.

A plot of the negative of the spring force $F_4$ for the unit 30 described above having a separation between adjacent spacers equal to 20 μm, is shown with a relatively shallow slope. A transducer 20' formed of units 30 having a 20 μm separation between adjacent spacers 22' therefore, typically operates in a bistable mode, that is, the transducer 20' is fully relaxed when no electrical voltage is applied and fully contracted when a voltage is applied with no external loading. However, in many applications it may be desirable to provide a range of stable equilibrium displacements for a fixed load, that is, analog control of the transducer displacement responsive to an analog electrical voltage input.

To obtain a range of stable equilibrium displacements, the stiffness of the units 30 may be greatly increased.

The three plots $F_1$, $F_2$, $F_3$ for three external forces show a greater slope than plot $F_4$, corresponding to the increased stiffness needed for the strips for the unit to operate over useful equilibrium ranges. These plots show that a range of stable equilibrium displacements are possible when the stiffness is increased. TABLE 1 below lists these equilibrium ranges for each external load.

TABLE 1

| External Load | Range of control |
| --- | --- |
| 1/8 dyne | 0.4 μm |
| 3/16 dyne | 0.25 μm |
| 1/4 dyne | 0.2 μm |

To understand the operation of the unit 30 in the continuously variable mode, it is useful to consider operation of the unit 30 from the zero voltage state to the breakdown voltage state. For a zero voltage applied, the electrostatic force curve would be flat corresponding to the x-axis. The intersection with the plot for 3/16 dyne external load, for example, then will occur at −0.15 μm. This is the amount by which the unit is stretched beyond the relaxed position shown in FIG. 3A. As an increasing voltage is applied, the electrostatic force curve begins to rise and the intersection point moves to the right in the graph. The maximum voltage for the unit 30 is 200 volts and, therefore, the intersection point with the plot for 3/16 dyne loading, for example, occurs at 0.1 μm. This is a stable equilibrium point for the unit 30. Thus, as voltage is raised from 0 to 200 volts, the unit 30 moves from 0.15 μm stretched to 0.1 μm contracted. It should also be noted that a second intersection occurs at 0.35 μm—a point of unstable equilibrium and outside the controllable range for the 3/16 dyne external loading.

The point on the x-axis where $x=0.5$ μm represents the mechanical limit of motion of the strips in the unit 30. The point on the x-axis at $x=0.3$ μm is critical because it corresponds to the tangent point of the electrostatic force curve $F_e$ and plot $F_4$. It represents the maximum displacement that can be achieved while still permitting a continuous range of displacement control for the ⅛ dyne external load.

Several parameters control the inherent spring force of the unit 30. At least one of the flexibility of the strips or the separation between adjacent spacers may be selected to provide a range of stable equilibrium positions. For example, from the graph of FIG. 4, the strips having the slope of the plots with increased stiffness $F_1$, $F_2$, $F_3$ must have an inherent spring force that is 31 times the stiffness of the strips illustrated by the plot $F_4$. Since the stiffness of the strips is related by $1/L^3$, to achieve an increase in stiffness to that shown, requires that the separation between adjacent spacers be reduced from 20 μm to about 6.4 μm. As an alternative to reducing the separation between spacers, the material of the strips may be selected with reduced flexibility, or each strip may be made thicker.

Figure 5A:
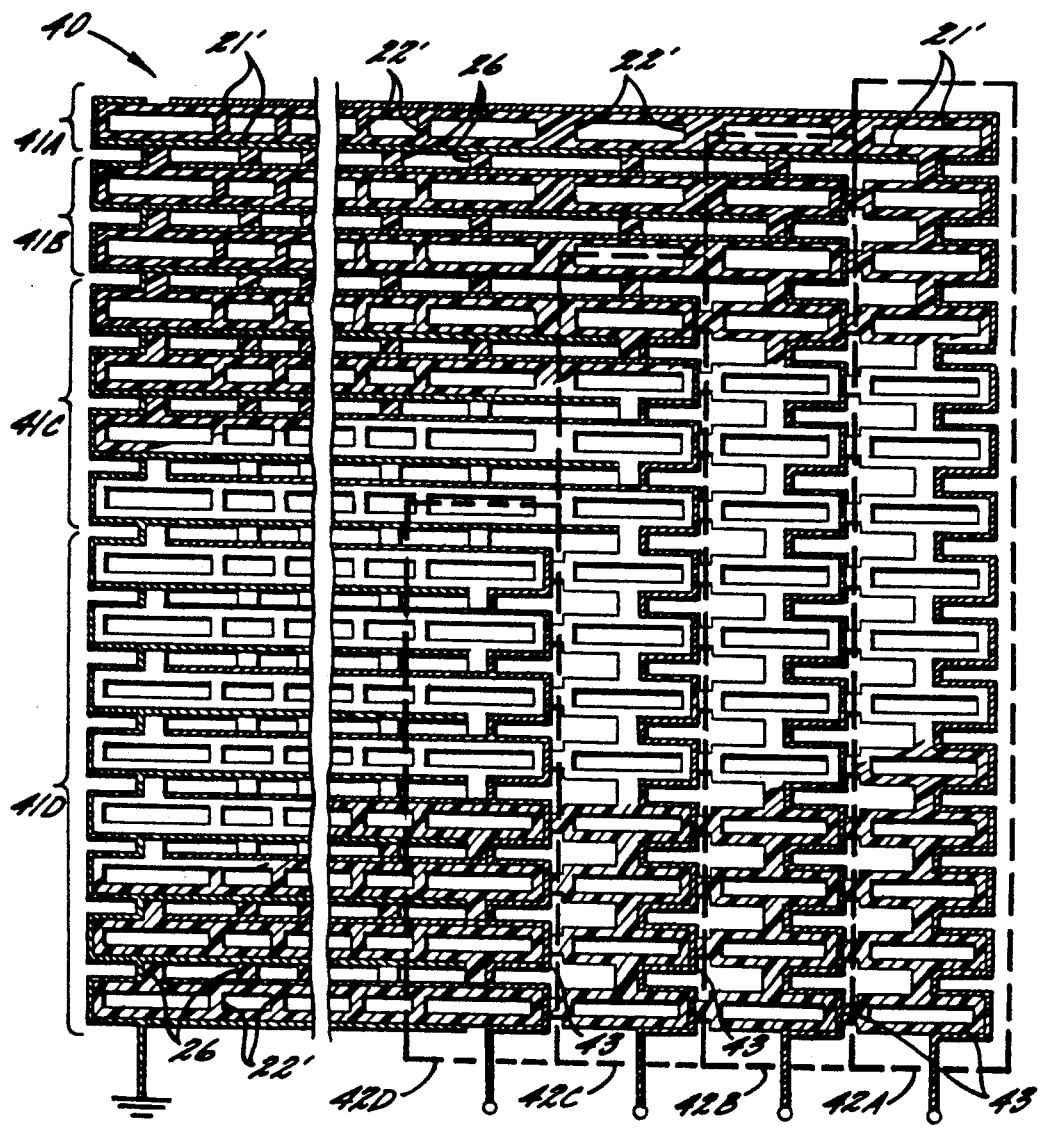
FIG. 5A is a top view of a microelectromechanical transducer of the present invention having a step-wise controllable displacement.

Step-wise variable control of the transducer may also be desired and achieved. FIG. 5A shows a microelectromechanical transducer 40 according to the present invention which has step-wise variable controllable contraction. The transducer 40 includes n stages 41A, 41B, 41C, 41D, Where n=4, with each stage comprised of strips 21', spacers 22', and pair connectors 26 as shown in FIG. 2A. The transducer 40 has a resolution of substantially one in $2^n-1$ steps, or 1 in 15 where n=4. The stages 41A-D include a series of pairs of strips 21' (FIG. 2A) having a number of 1, 2, 4, and 8 pairs respectively. In addition to the digital-type control shown, any step-wise variable control may be achieved by providing stages with a desired relative number of pairs of strips 21'.

Each stage is connected to a compressible strand 42A, 42B, 42C, 42D for selective individual powering. The strands 42A-D are compressible with the transducer 40 and the strands may be formed of the common dielectric layer with the strips 21', spacers 22', and pair connectors 26. A metal layer 43 may be selectively applied to the strands 42A-D on predetermined portions thereof to form the desired interconnection pattern. All of the stages 41A-D may also be connected to a common ground. As would be readily understood by those skilled in the art, any desired resolution may be achieved by providing additional stages with the prescribed number of strips 21' therein. In addition, the number of strips 21' in the lowest resolution stage may be increased as long as the other stages have a proportionately higher number of strips 21'.

Figure 5B:
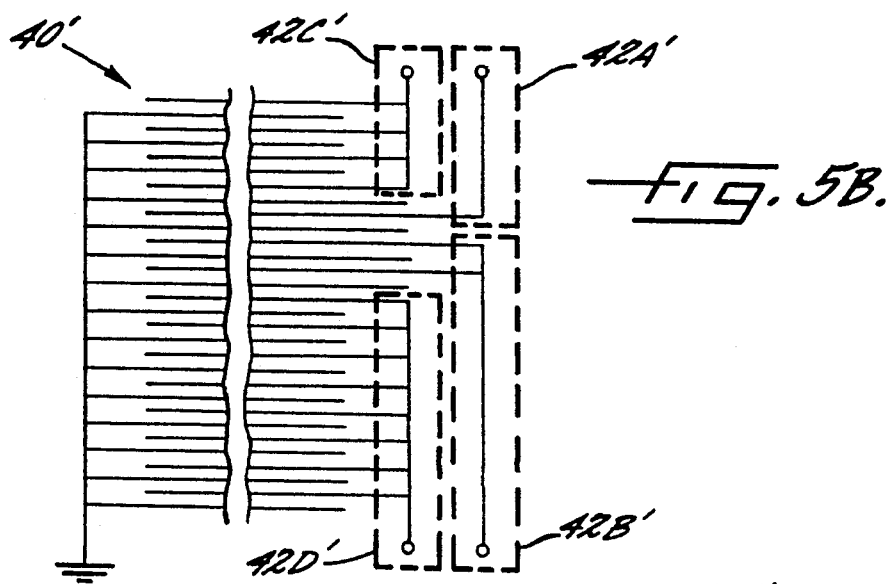
FIG. 5B is a top view of another embodiment of the microelectromechanical transducer of the present invention having a step-wise controllable displacement.
Figure 5C:
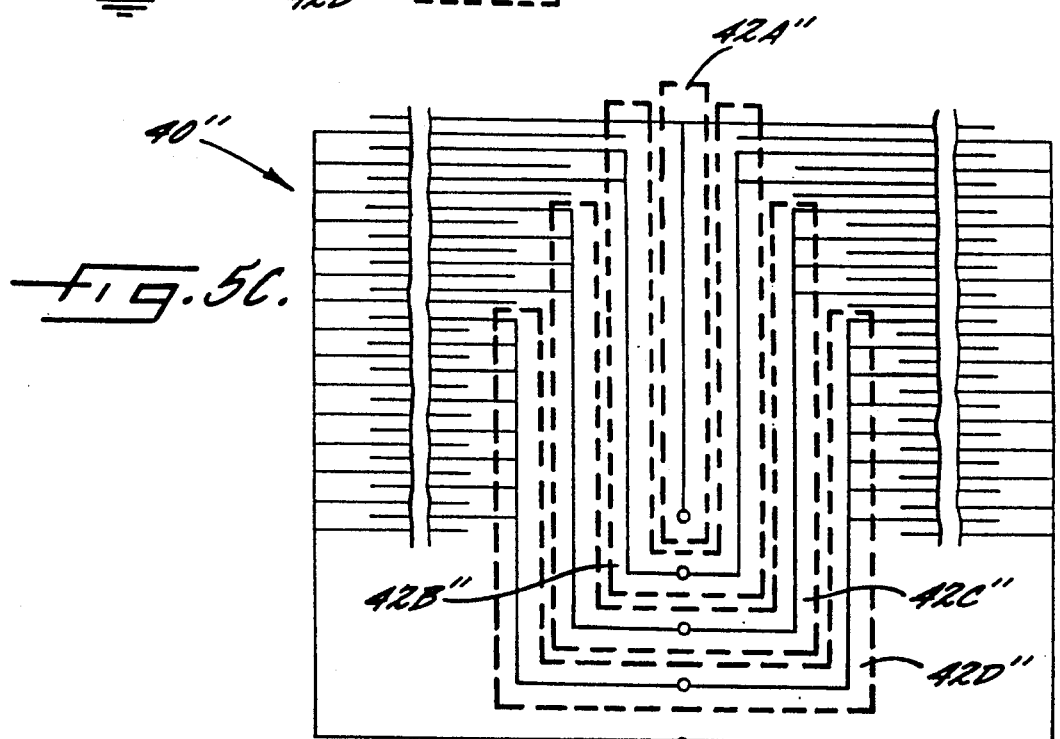
FIG. 5C is a top view of another embodiment of the microelectromechanical transducer of the present invention having a step-wise controllable displacement.

The actual resolution of the transducer 40 may be affected, to a slight degree, by the passive compressible strands 42A-D that are formed into the transducer 40 to connect to the individual stages 41A-D FIGS. 5B and 5C schematically show other embodiments of the step-wise variable transducer 40', 40" and include different configurations of the compressible strands 42A'-D', 42A"-D" which may be desired to reduce any unwanted effects of the passive compressible strands on the overall transducer contraction.

In FIG. 5B the compressible strands 42A', 42C' are shown extending an electrical connection to the opposite side of the transducer 40' from the strands 42B', 42D'. The arrangement of strands 42A'-D' shown in FIG. 5B reduces the number of passive portions in the transducer 40'.

FIG. 5C shows the compressible strands 42A"-D" aligned in the center portion of the transducer 40". Thus, the passive portions of the transducer 40' are symmetrically positioned in the transducer 40' so that the overall contraction is more uniform.

Figure 6:
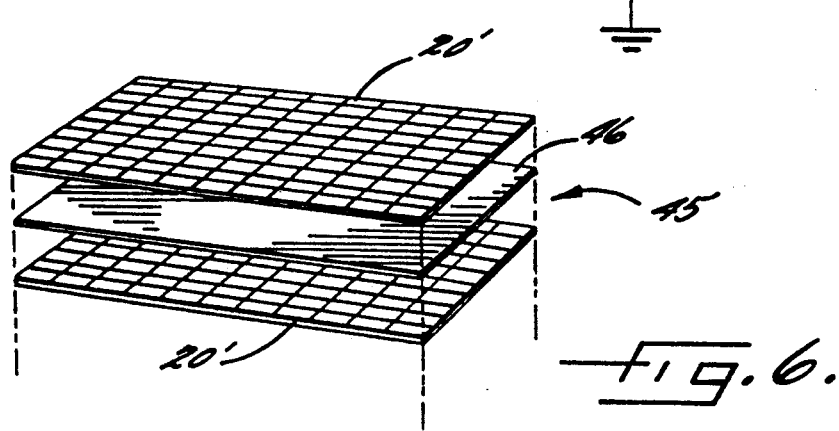
FIG. 6 is an exploded view of a vertical stack of two planar transducers as shown in FIG. 2A according to the present invention.

In addition to the planar microelectromechanical transducers illustrated in FIGS. 1A-1C, 2A-2C, and 5A-5C, each of these transducers may also be vertically stacked to provide a greater contraction force. FIG. 6 illustrates two planar transducers 20' as shown in FIG. 2A stacked in a vertical orientation to produce an overall transducer 45 having a cumulative contraction force. The planar transducers 20' may preferably be separated by a compressible dielectric sheet 46. The dielectric sheet 46 serves to insulate the conductive portions of the transducers 20'. The sheet 46 may preferably be formed of a thin dielectric layer having a pattern of voids therein corresponding to the openings between the strips 21', spacers 22', and pair connectors 26 of the transducers 20'. The sheet 46 may preferably be made of polyimide approximately 1 μm thick to aid in compressibility of the overall transducer 45.

As an alternative to the compressible dielectric sheet 46 as shown in FIG. 6, a polyimide layer may be spun onto each transducer 20' to provide insulation between adjacent transducers 20'. An electrical bus connection, not shown, may be established in the overall transducer 45 to connect each planar transducer 20' to the external signal source. As would be readily understood by those skilled in the art, a large number of planar transducers 20' may be stacked to provide an increased contraction force for the overall transducer 45.

Stacking may increase the force for the transducer 45 to correspond to the forces achieved by commercially available solenoids, for example. However, the transducer 45 would be hundreds of times less in weight than a conventional solenoid. A further advantage of the transducer 45 over conventional solenoids, is that the transducer 45 consumes almost no power at a stable equilibrium position. Electrical power is consumed by the transducer 45 only when a charging current flows as when the transducer 45 is contracting. Only a minute dielectric leakage current flows at the limits of motion or at any stable equilibrium points. A conventional solenoid, in contrast, consumes power as long as the actuating coil is energized.

Figure 7A:
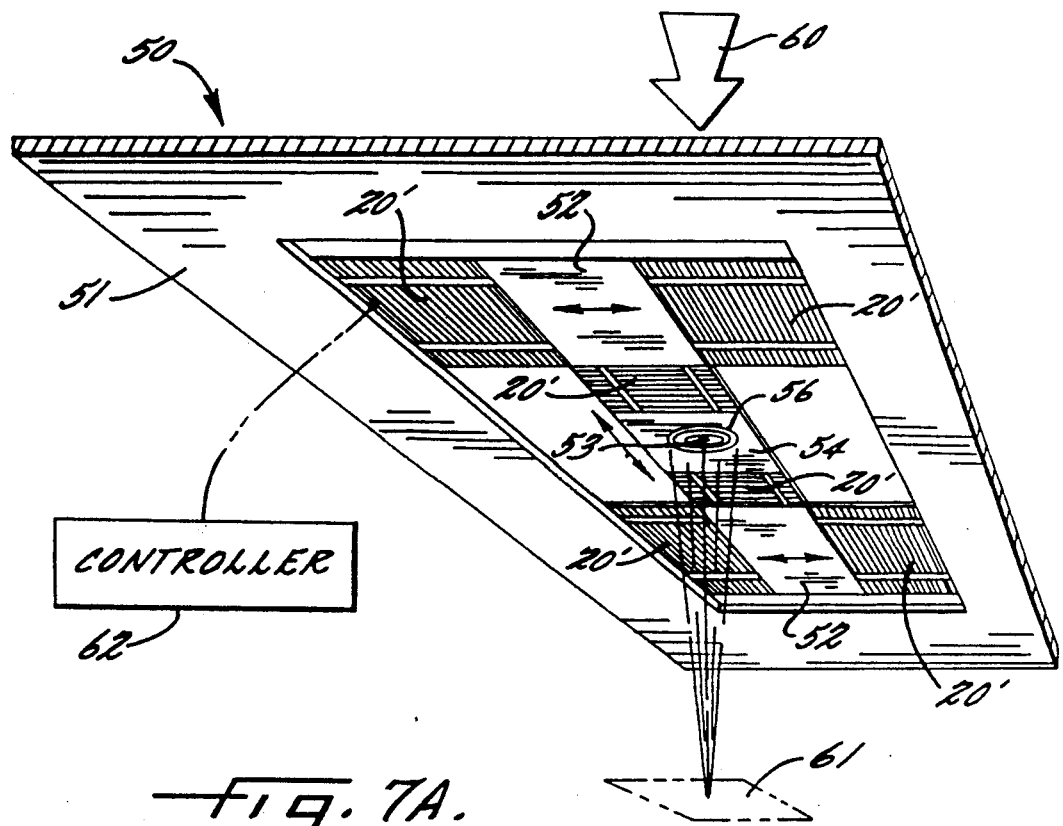
FIG. 7A is a perspective view of an optical scanning microscopy membrane according to the present invention utilizing the microelectromechanical transducers as shown in FIG. 2A.

The transducers according to the present invention may be used in micropositioning applications where small movements are required and where binding and overshoot must be minimized. As illustrated in FIG. 7A, one such application is for micropositioning for optical microscopy scanning. The scanning membrane 50 includes a frame 51 which may preferably be formed of a silicon substrate upon which the electronic driving circuitry, not shown, may also be fabricated. Two opposing pairs of transducers 20' are connected to the frame 51 with a rigid dielectric coupling 52 between the transducers 20' of each pair. These opposing pairs of transducers 20' position the photodetector 53 in a first dimension. The couplings 52 may include a conductive metal layer 55 on predetermined portions thereof (FIG. 7B) to connect to the photodetector 53 on the dielectric mounting plate 54. The scanning membrane 30 thus operates without sliding friction as is typically encountered in a conventional micropositioner.

A second pair of opposing transducers 20' are connected between the couplings 52 and serve to position the photodetector mounting plate 54 in a second dimension. The photodetector 53 may thus be positioned in two dimensions by the selective activation of the transducers 20'. Connections to the photodetector 53 and the internal transducers 20' may 20 be made by compressible connectors 57 formed in the membrane 50 in parallel with the transducers 20'.

Figure 7C:
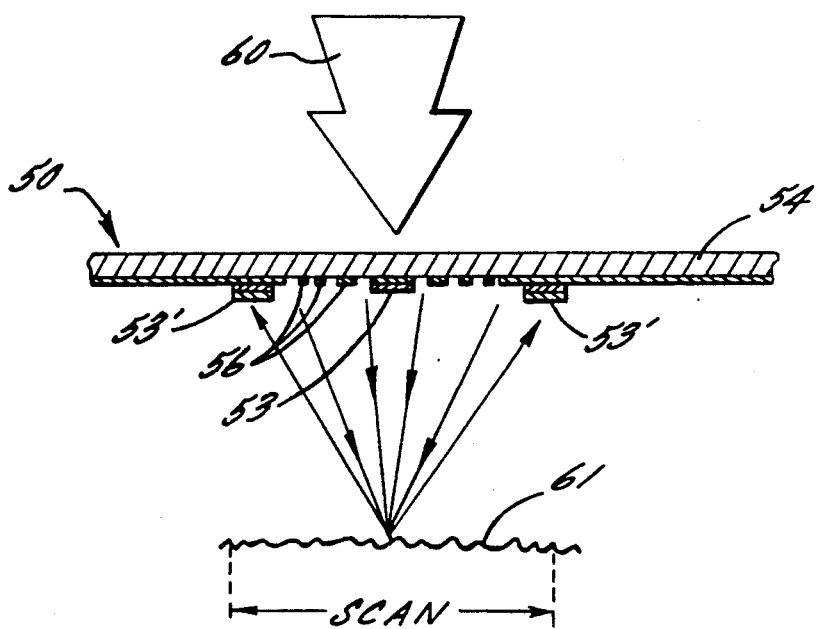
FIG. 7C is a cross-sectional side view of a photodetector and Fresnel lens according to the present invention for the microscopy scanning membrane as shown in FIG. 7A.
Figure 7B:
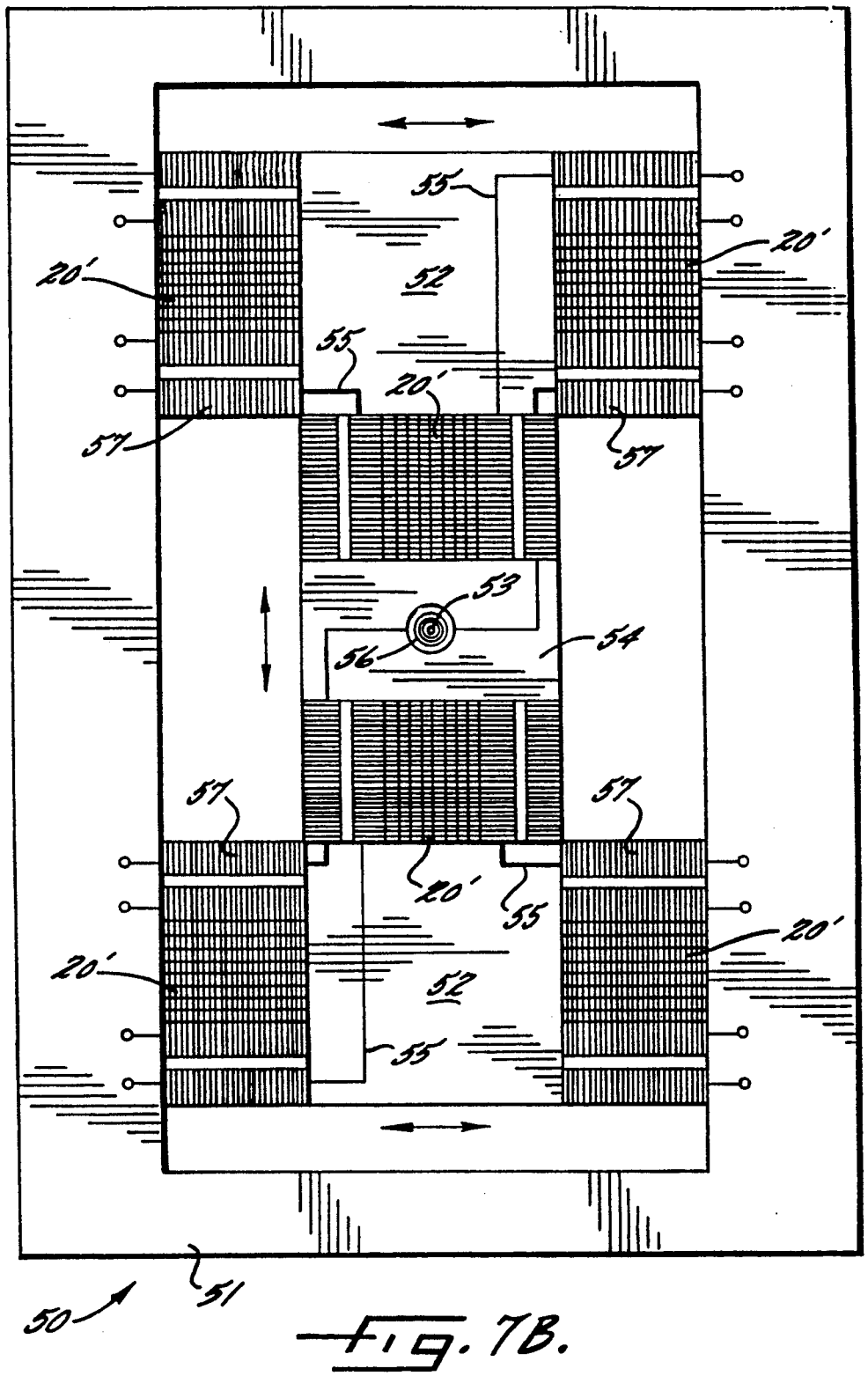
FIG. 7B is a top view of the microscopy scanning membrane according to the present invention as shown in FIG. 7A.

A broad flood of monochromatic, coherent, collimated illumination 60 is directed onto the membrane 50. As would readily understood by those having skill in the art, the broad flood of illumination 60 may be produced by an expanded laser beam for example. The photodetector mounting plate 54 also preferably includes a Fresnel lens 56 for focussing the flood of illumination 60 onto the surface 61 to be scanned. The illumination 60 reflected from the surface 61 strikes the photodetector 53. The photodetector 53 may be made from a light sensitive compound, such as cadmium sulfide, or other materials as are well known to those having skill in the art. The photodetector 53 may be a dot of light sensitive material (FIGS. 7A and 7B) centered within the Fresnel lens 56, or it may be an annular ring 53' of light sensitive material as best shown in FIG. 7C. It may also be desirable to use both a dot 53 an annular ring 53' photodetector, as shown in FIG. 7C, to increase contrast by distinguishing obliquely or directly reflected illumination.

The transducers used in the scanning membrane 50 may also be continuously controllable as described more fully above or they may step-wise controllable as also described above. The transducers 20', couplings 52, and photodetector mounting plate 54 may preferably be formed from a common dielectric layer of a material, such as polyimide. The operation of the scanning membrane 50 may be controlled by a separate controller 62. The controller 62 may also process the data from the photodetector 53 to provide a video image of the scanned surface 61. Alternately, the controller 62 may be formed on the silicon frame 51 as part of a combined process sequence which also forms the scanning membrane 50.

The transducer 20 as shown in FIG. 1A may be fabricated as illustrated in the intermediate process steps shown in FIGS. 8A through 8D. FIG. 8A shows an intermediate structure 65 having a silicon substrate 70 with a first buffer layer 71 of low temperature oxide, a support layer 72 of polyimide, and an upper buffer layer 73 of plasma enhanced chemical vapor deposited low temperature oxide. A pattern of resist 74 is applied to the upper oxide layer 73. The upper buffer layer 73 and the support layer 72 are then reactive ion etched and a second pattern of resist 74' is applied to form the intermediate structure 66 shown in FIG. 8B. The intermediate structure 66 of FIG. 8B is then reactive ion etched. A metal layer 75 is then applied by an evaporation source 76 positioned at an angle o from normal to the surface as shown in FIG. 8C to form the intermediate structure 67 shown in FIG. 8D. The strips 21 of the structure 67 include raked portions, best shown in FIG. 1C, to selectively shade portions of the structure 67 during the metal deposition step. Undesired portions of the deposited metal layer 75 may be removed from the structure 67, for example, by an aqueous buffered oxide etch using $HF+NH_4F$ which selectively dissolves the silicon dioxide layers 71, 73. The aqueous buffered oxide etching also separates the transducer 20 from the silicon substrate 70.

Figure 9A:
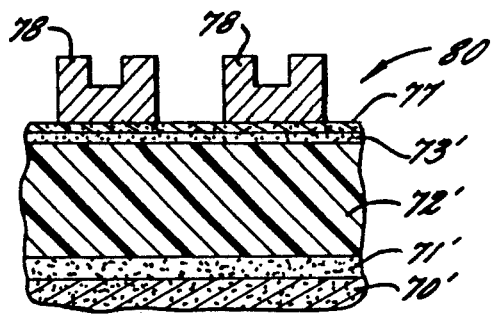
FIGS. 9A to 9G are cross-sectional views illustrating the intermediate structures for another method of fabricating the transducer as shown in FIG. 1A according to the present invention.
Figure 9E:
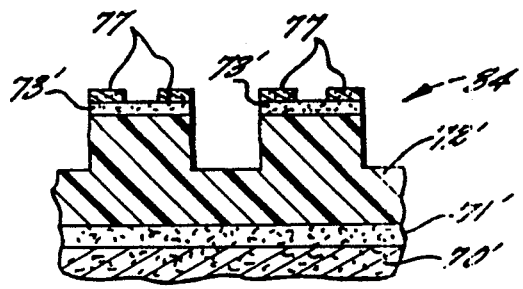
Figure 9B:
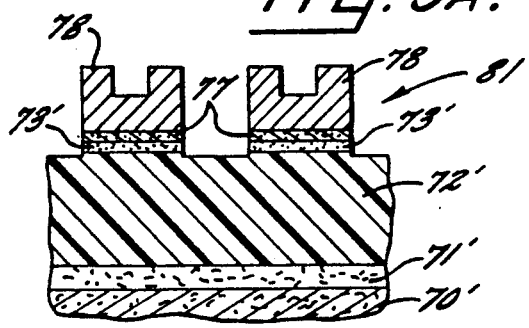
Figure 9F:
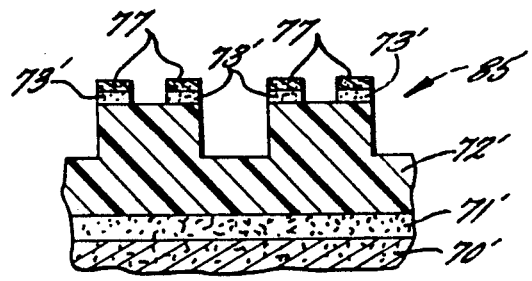
Figure 9C:
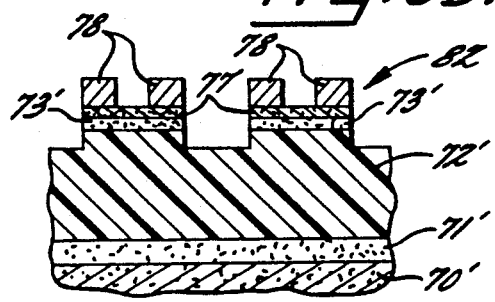
Figure 9G:
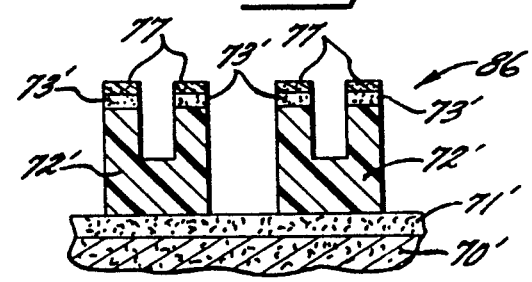
Figure 9D:
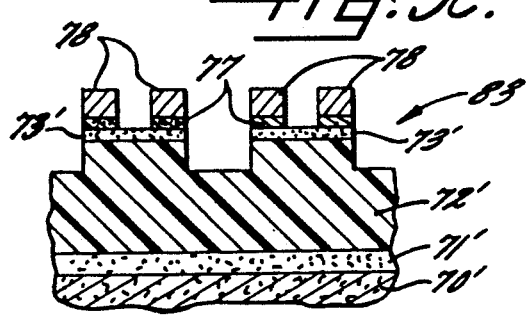

An alternative process for forming the transducer 20 illustrated in FIG. 1A uses a multilevel, or gray level, resist as shown in FIGS. 9A through 9G. The structure 80 consists of a silicon substrate 70', a first buffer layer 71' of low temperature oxide, a support layer 72' of polyimide, an upper buffer layer 73' of oxide, and an upper evaporated silicon layer 77. A pattern of multilevel resist 78 is first applied. The structure so is then reactive ion etched removing the exposed portions of the upper buffer layer 73' and the upper evaporated silicon layer 77 leaving the intermediate structure S1 shown in FIG. 9B. The resist 78 and exposed support layer 72' are then reactive ion etched producing the intermediate structure 82 as shown in FIG. 9C. A selective reactive ion etching is then used to remove exposed portions of the upper evaporated silicon layer 77 creating the intermediate structure 83 of FIG. 9D. The structure 83 is then further reactive ion etched to remove the multilevel resist 78 and remove approximately half of the exposed support layer 72' to produce the structure 84 of FIG. 9E. The exposed portions of the upper oxide layer 73' are then etched away leaving the structure 85 as shown in FIG. 9F. The support layer 72' may then be reactive ion etched to produce the intermediate structure 86 of FIG. 9G. As shown in FIGS. 8C and 8D, a metal layer may then be deposited on the structure 86 and the upper 73' and lower 71' buffer layers then etched to complete the fabrication process.

Many modifications and other embodiments of the invention will come to one skilled in the art having the benefit of the teachings presented in the foregoing descriptions and the associated drawings. Therefore, it is to be understood that the invention is not to be limited to the specific embodiment disclosed, and that modifications and embodiments are intended to be included within the scope of the appended claims.

That which is claimed is:

1. A method for making an electromechanical transducer comprising the steps of:
    forming on a substrate a dielectric layer having a plurality of strips maintained in a closely spaced relation by a plurality of spacers;
    applying a conductive layer to predetermined portions of the strips and spacers; and
    separating the dielectric layer from the substrate.

2. The method of claim 1 wherein said forming a dielectric layer step comprises the steps of:
    forming on the substrate a dielectric support layer; and
    etching predetermined portions of the dielectric support layer to form the dielectric layer having the plurality of strips maintained in the closely spaced relation by the plurality of spacers.

3. The method of claim 1 wherein the step of forming the dielectric layer is preceded by the step of forming on the substrate a buffer layer, and wherein the step of separating the multilevel support structure comprises the step of etching the buffer layer.

4. A method of making an electromechanical transducer comprising the steps of:
    forming on a substrate a multilevel support structure having predetermined raked portions;
    depositing a metal on the multilevel support structure at an angle from normal thereto so that the raked portions shade predetermined portions of the multilevel support structure; and
    separating the multilevel support structure from the substrate.

5. The method of claim 4 wherein said forming a multilevel support structure step comprises the steps of:
    forming on the substrate a dielectric support layer; and
    etching predetermined portions of the dielectric support layer to form the multilevel support structure having a plurality of strips maintained in a closely spaced relation by a plurality of spacers.

6. The method of claim 5 wherein the step of forming the dielectric support structure layer is preceded by the step of forming on the substrate a buffer layer, and wherein the step of separating the multilevel support structure comprises the step of etching the buffer layer.

7. A method of making an electromechanical transducer comprising the steps of:
    forming on a substrate a dielectric layer;
    forming a multilevel mask on predetermined portions of the dielectric layer;
    etching predetermined portions of the mask and dielectric layer to form a multilevel support structure having a plurality of strips maintained in a closely spaced relation by a plurality of spacers; and
    separating the multilevel support structure from the substrate.

8. The method of claim 7 further comprising the step of applying a conductive layer to predetermined portions of the strips and spacers.

9. The method of claim 7 wherein the step of forming the dielectric layer is preceded by the step of forming on the substrate a buffer layer, and wherein the step of separating the multilevel support structure comprises the step of etching the buffer layer.

* * * * *

UNITED STATES PATENT AND TRADEMARK OFFICE
CERTIFICATE OF CORRECTION

PATENT NO. : 5,290,400
DATED : March 1, 1994
INVENTOR(S) : Bobbio

It is certified that error appears in the above-identified patent and that said Letters Patent is hereby corrected as shown below:

```
     Column 1, line 27, after "together" (first
occurrence) insert --.--.
     Column 1, line 29, after "energy" insert --.--.
     Column 2, line 4, after "together" insert --.--.
     Column 2, line 37, after "friction" insert --.--.
     Column 2, line 67, after "after" insert --only--.
     Column 6, line 15, after "material" insert --.--.
     Column 9, line 2, "20," should be --20'--.
     Column 9, line 25, after "20'" insert --.--.
     Column 9, line 31, "pairs:" should be --pairs;--.
     Column 9, line 43, "e" should be --ε--.
     Column 11, line 64, "Where" should be --where--.
     Column 12, line 25, after "41A-D" insert --.--.
     Column 12, line 40, "40'" should be --40"--.
     Column 12, line 41, "40'" should be --40"--.
     Column 13, line 42, "20" should be deleted.
     Column 14, line 25, "o" should be --α--.
     Column 14, line 44, "so" should be --80--.
     Column 14, line 47, "S1" should be --81--.
```

Signed and Sealed this

Fifth Day of December, 1995

Attest:

BRUCE LEHMAN

*Attesting Officer*    Commissioner of Patents and Trademarks